(12) United States Patent
Pelletter

(10) Patent No.: US 9,278,271 B2
(45) Date of Patent: Mar. 8, 2016

(54) SYSTEM FOR SENSING HUMAN MOVEMENT AND METHODS OF USING THE SAME

(71) Applicant: Michael J. Pelletter, Fredonia, NY (US)

(72) Inventor: Michael J. Pelletter, Fredonia, NY (US)

( * ) Notice: Subject to any disclaimer, the term of this patent is extended or adjusted under 35 U.S.C. 154(b) by 0 days.

(21) Appl. No.: 14/062,891

(22) Filed: Oct. 25, 2013

(65) Prior Publication Data

US 2014/0051519 A1 Feb. 20, 2014

Related U.S. Application Data

(62) Division of application No. 13/055,950, filed as application No. PCT/US2009/051780 on Jul. 25, 2009, now Pat. No. 8,602,949.

(60) Provisional application No. 61/083,922, filed on Jul. 26, 2008.

(51) Int. Cl.
*A63B 69/32* (2006.01)
*A63B 69/00* (2006.01)
(Continued)

(52) U.S. Cl.
CPC .............. *A63B 69/32* (2013.01); *A63B 69/004* (2013.01); *A63F 13/10* (2013.01); *G06F 3/011* (2013.01); *A63B 2024/004* (2013.01); *A63B 2024/0025* (2013.01); *A63B 2024/0096* (2013.01); *A63B 2220/53* (2013.01); *A63B 2220/801* (2013.01); *A63B 2220/805* (2013.01); *A63B 2225/50* (2013.01); *A63F 2300/1043* (2013.01);
(Continued)

(58) Field of Classification Search
CPC ...... A63B 69/32; A63B 69/004; A63F 13/10; G06F 3/011

USPC .......................................................... 482/83
See application file for complete search history.

(56) References Cited

U.S. PATENT DOCUMENTS 4,088,315 A 5/1978 Schemmel
4,401,303 A 8/1983 Anderson
(Continued)

FOREIGN PATENT DOCUMENTS

KR 20-0192183 Y1 8/2000
KR 10-2001-0088010 A 9/2001
KR 20-0235676 Y1 10/2001

OTHER PUBLICATIONS

Punch, Punch, Revolution: Internet URL: http://www.wiitube.com/view_question.php?post_id=15025&post_type=6 Owned by Eugine Chen and AJ Vaynerchuk, Jun. 16, 2007.

*Primary Examiner* — Corbett B Coburn
(74) *Attorney, Agent, or Firm* — Gerald F. Dudding; GFD Patents LLC

(57) ABSTRACT

A system and method are provided for translating gross human movement into electronic signals and therapeutic, training, or educational uses for the system. An exercising or video gaming system, comprising: a floor pad controller, and a striking controller. The floor pad controller having force sensor(s) and/or placement sensor(s) arranged in a pattern in the plane of a ground or floor. The striking controller having force sensor(s) and contact sensor(s) arranged in an curved grid between the outer layer of the striking controller and an inner core. Applying force to any sensor(s) in the floor pad controller or striking controller executes an action in response to an instruction from the exercising or video gaming system; and an inner core returnably coupled to a ground or floor of a room, so that the striking controller returns to an upright position after being struck by the user.

11 Claims, 6 Drawing Sheets

(51) Int. Cl.
  *A63F 13/40* (2014.01)
  *G06F 3/01* (2006.01)
  *A63B 24/00* (2006.01)

(52) U.S. Cl.
  CPC . *A63F2300/1062* (2013.01); *A63F 2300/1068* (2013.01); *A63F 2300/8029* (2013.01)

(56) References Cited

U.S. PATENT DOCUMENTS

| | | |
|---|---|---|
| 4,720,789 A | 1/1988 | Hector et al. |
| 5,045,687 A | 9/1991 | Gurner |
| 5,194,006 A | 3/1993 | Zaenglein, Jr. |
| 5,498,846 A | 3/1996 | Chin |
| 5,553,860 A | 9/1996 | Zelikovich |
| 5,616,078 A | 4/1997 | Oh |
| 5,733,193 A | 3/1998 | Allard et al. |
| 6,110,079 A | 8/2000 | Luedke et al. |
| 6,563,487 B2 | 5/2003 | Martin et al. |
| 7,308,818 B2* | 12/2007 | Considine et al. ..... A63B 69/20 73/12.09 |
| 2004/0009814 A1* | 1/2004 | Kim ................. 463/36 |
| 2005/0209066 A1 | 9/2005 | Penney |
| 2006/0258515 A1* | 11/2006 | Kang et al. ............. 482/83 |
| 2008/0068351 A1 | 3/2008 | Rosenberg et al. |

* cited by examiner

SYSTEM FOR SENSING HUMAN MOVEMENT AND METHODS OF USING THE SAME

FIELD OF THE INVENTION

The present invention relates generally to a system for sensing human motion and methods of using the system. More specifically the present invention relates to a system for translating gross human movement into electronic signals and therapeutic, training, or educational uses for the system.

BACKGROUND

Systems for sensing human movement are used for therapy, recreation, and or education. Such systems translate physical dynamic movement of a person into an input value. Use of these systems can lead to muscle pulls or torn rotator cuffs. Therefore there is a need for improved systems for sensing human movement where use of these systems does not lead muscle or rotator cuff injuries.

SUMMARY OF THE INVENTION

A first aspect of the present invention provides an exercising or gaming system, comprising: a floor pad controller, comprising: force sensor(s) and/or placement sensor(s) arranged in a pattern in the plane of a ground or floor, so that whenever force is applied to the floor pad controller by a user, the force and/or placement of the force is registered by the force sensor(s) and/or placement sensor(s), wherein the force sensor(s) and/or placement sensor(s) detect force sensor(s) and/or placement applied against the floor pad controller; a striking controller, comprising: an outer layer, comprising: force sensor(s) and/or contact sensor(s) arranged in an curved grid between the outer layer of the striking controller and the inner core, the force sensor(s) and/or contact sensor(s) comprise transducer(s) and/or contact closure(s) to sense force sensor(s) and/or contact applied against the striking controller, wherein applying force to any force sensor(s) and/or placement sensor(s) in the grid executes an action in response to an instruction from the exercising or video gaming system; and an inner core returnably coupled to a ground or floor of a room, so that the striking controller returns to an upright position after being struck by the user.

A second aspect of the present invention provides a method for using an exercising or playing an interactive video gaming system, comprising: an outer layer, an inner core and an interface between the inner core and a floor or ground for returnably coupling the striking controller to the ground or floor of a room, so that the striking controller returns to an upright position after being struck by the user; force sensor(s) and/or contact sensor(s) arranged in an curved grid between the outer layer of the striking controller and the inner core, wherein the force sensor(s) and/or contact sensor(s) comprise transducer(s) and/or contact closure(s) to sense force sensor(s) and/or contact of the force applied against the striking controller, wherein applying force to any force sensor(s) and/or contact sensor(s) in the grid executes an action in response to an instruction from a video game, wherein a user is instructed to either strike, grapple, step, or jump the striking controller while simultaneously looking at the striking controller and the monitor; and providing an interactive or non-interactive safety zone by essentially completely extending either the combination of the outer layer and the curved grid of force sensor(s) and/or contact sensor(s) or the outer layer in which the force sensor(s) and/or contact sensor(s) are absent, respectively, to the interface between the inner core and the ground or floor of the room.

A third aspect of the present invention provides a kit for playing rhythmic games, comprising: an exercising or entertainment video gaming system that processes and displays rhythmic movement of a user in two or more dimensions, wherein the user is not required to wear any game interactive or safety equipment; a monitor for displaying the rhythmic movement of the user; a processor for operating the exercising or video gaming system; a program memory, containing instructions from a video game, operatively connected to said processor; a controller, operatively coupled to said processor, wherein the controller comprises: a floor pad controller, comprising: force sensor(s) and/or placement sensor(s) arranged in a pattern in the plane of a ground or floor, so that whenever force is applied to the floor pad controller by a user, the force sensor(s) and/or placement of the force is registered by the force sensor(s) and/or placement sensor(s), wherein the force sensor(s) and/or placement sensor(s) detect force sensor(s) and/or placement applied against the floor pad controller; a striking controller, comprising: an outer layer, comprising: force sensor(s) and/or contact sensor(s) arranged in an curved grid between the outer layer of the striking controller and the inner core, wherein the force sensor(s) and/or contact sensor(s) comprise transducer(s) and/or contact closure(s) to sense force sensor(s) and/or contact applied against the striking controller, wherein applying force to any force sensor(s) and/or contact sensor(s) in the grid executes an action in response to an instruction from the exercising or video gaming system; and an inner core returnably coupled to a ground or floor of a room, so that the striking controller returns to an upright position after being struck by the user.

A fourth aspect of the present invention provides a controller for an exercising or video gaming system, comprising: a striking controller, comprising; an outer layer, an inner core and an interface between the inner core and a floor or ground for reflexively coupling the striking controller to the ground or floor of a room; force sensor(s) and/or contact sensor(s) arranged in an curved grid between the outer layer of the striking controller and the inner core, the force sensor(s) and/or contact sensor(s) comprising force sensors and contact closures to sense contact and force applied against the striking controller, wherein applying force to any force sensor(s) and/ or contact sensor(s) in the grid executes an action in response to an instruction from the exercising or video gaming system; a body position sensor; and a radial interactive uppercut bar therebetween.

A fifth aspect of the present invention provides a striking controller for an exercising or video gaming system, comprising: an outer layer, an inner core and an interface between the inner core and a floor or ground for reflexively coupling the striking controller to the ground or floor of a room; force sensor(s) and/or contact sensor(s) arranged in an curved grid between the outer layer of the striking controller and the inner core, the force sensor(s) and/or contact sensor(s) comprising force sensors and contact closures to sense contact and force applied against the striking controller, wherein applying force to any force sensor(s) and/or contact sensor(s) in the grid executes an action in response to an instruction from the exercising or video gaming system; and a microphone and headset for communicating with multiplayers, which does not also control the exercising or video gaming system.

A sixth aspect of the present invention provides a controller for an exercising or video gaming system, comprising: an outer layer, an inner core and an interface between the inner core and a floor or ground for reflexively coupling the striking controller to the ground or floor of a room; force sensor(s) and/or contact sensor(s) arranged in an curved grid between the outer layer of the striking controller and the inner core, the force sensor(s) and/or contact sensor(s) comprising force sensors and contact closures to sense contact and force applied against the striking controller, wherein applying force to any force sensor(s) and/or contact sensor(s) in the grid executes an action in response to an instruction from the exercising or video gaming system; and an interactive or non-interactive safety zone by essentially completely extending either the combination of the outer layer and the curved grid of force sensor(s) and/or contact sensor(s) or the outer layer, respectively, to the interface between the inner core and the ground or floor of the room; the exercising or video gaming system for instructing a user to safely either strike, grapple, step, or jump the striking controller while simultaneously looking at the striking controller and the monitor.

A seventh aspect of the present invention provides a method for safely using an exercising or video gaming system, comprising: providing a striking controller, comprising; an outer layer, an inner core and an interface between the inner core and a floor or ground for reflexively coupling the striking controller to the ground or floor of a room; force sensor(s) and/or contact sensor(s) arranged in an curved grid between the outer layer of the striking controller and the inner core, the force sensor(s) and/or contact sensor(s) comprising force sensors and contact closures to sense contact and force applied against the striking controller, wherein applying force to any force sensor(s) and/or contact sensor(s) in the grid executes an action in response to an instruction from the exercising or video gaming system; and providing an interactive or non-interactive safety zone by essentially completely extending either the combination of the outer layer and the curved grid of force sensor(s) and/or contact sensor(s) or the outer layer, respectively, to the interface between the inner core and the ground or floor of the room, and wherein the exercising or video gaming system instructs a user to execute a roundhouse kick of the striking controller while simultaneously looking at the striking controller and the monitor.

An exercising or video gaming system, comprising: a floor pad controller, comprising: force sensor(s) and/or placement sensor(s) arranged in a pattern in the plane of a ground or floor, so that whenever force is applied to the floor pad controller by a user, the force and/or contact of the force is registered by the force sensor(s) and/or placement sensor(s), wherein the force sensor(s) and/or placement sensor(s) detect force and/or placement information applied against the floor pad controller; a striking controller, comprising: an outer layer, comprising: force sensor(s) and/or contact sensor(s) arranged in an curved grid between the outer layer of the striking controller and the inner core, the force sensor(s) and/or contact sensor(s) comprising force sensors and contact closures to sense contact and force applied against the striking controller, wherein applying force to any force sensor(s) and/or contact sensor(s) in the grid executes an action in response to an instruction from the exercising or video gaming system, wherein neither the floor pad controller nor the striking controller require an input from a headset or microphone worn by a user of the exercising or video gaming system.

DETAILED DESCRIPTION OF THE EMBODIMENTS

Figure 1:
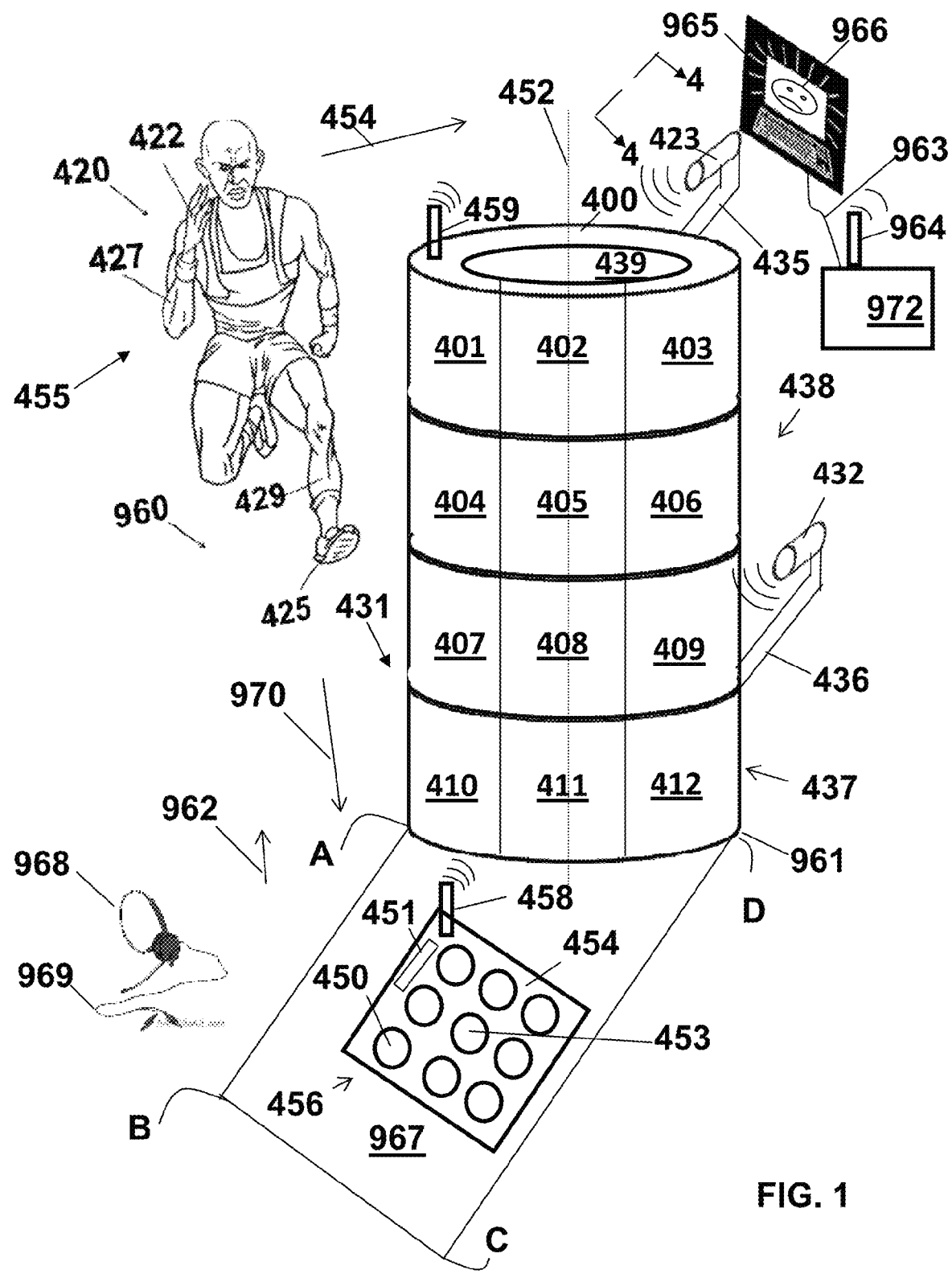
FIG. 1 depicts a front elevation view of an exercising or video gaming system, in accordance with embodiments of the present invention.

FIG. 1 depicts an exercising or video gaming system 960, comprising: a floor pad controller 456, a striking controller 438, having an inner core 439 and an outer shell 400. The exercising or video gaming system 960 may be networked to a processor 972 on which an exercising or video gaming system may be running. The processor 972 comprises a video monitor 965 and a wireless communication circuit 964. The processor 972 may communicate with the monitor wirelessly, via wireless circuit 964 or via wire 963.

In one embodiment, the exercising or video gaming system 960, comprises a microphone and headset 968 for communicating with multi-players, but does not also control the exercising or video gaming system.

In one embodiment, the exercising or video gaming system 960, comprises a microphone and headset 968 for communicating with multi-players, wherein neither the floor pad controller 456 nor the striking controller 438, 913 require an input from a microphone and headset 968 worn by a user 420 of the exercising or video gaming system 960.

The floor pad controller 456 comprises force sensor(s) and/or placement sensor(s) 450 oriented parallel to a plane ABCD of the floor 967, and a center force sensor(s) and/or placement sensor 453, also oriented parallel to the plane ABCD of the floor 967, so that whenever a force 970 is applied to the floor pad controller 456 by a user 420, the force is transmitted to the processor 972 by the force sensor(s) and/or placement sensor(s) 450 and 453. The force sensor(s) and/or placement sensor(s) 450 and 453 may be transducer(s) which convert pressure to an analog or digital signal that corresponds to the force applied to the floor pad controller 456 by the user 420, or contact closure(s) which are switches that may either be open or closed to the flow of electricity, so that an electrical circuit is completed when the contact closure is closed by a force applied to the contact closure in the floor pad controller 456 by the user 420, or combinations thereof. The contact closure(s) may close when the force exceeds a threshold force in the amount of 2.5 Newtons. Hereinafter "triggering the force sensor(s) and/or contact sensor(s) 450 and 453 is defined as applying a force in the amount of at least 2.5 Newtons to the force sensor(s) and/or placement sensor(s) 450 and 453, resulting in the floor pad controller 456 sending a signal to the processor 972 that the force has been applied.

In one embodiment, the floor pad controller 456 may be circular, square, rectangular or trapezoidal in shape. The floor pad controller 456 may have an area from about 4 sq. ft. to about 16 sq. ft. Each unit of the grid pattern comprising the force sensor(s) and/or placement sensor(s) 450, 453 is at least 1 ft. in diameter, and the units of the grid may have a square, rectangular, circular, triangular or trapezoidal shape. In one embodiment, the center force sensor(s) and/or placement sensor 453 of the floor pad controller 456 should be positioned within at least one arms length of the user 420 from the center of the striking controller 438.

The force sensor(s) and/or placement sensor(s) 450, 453 are able to sense contact and force of the user's foot 425 when the foot 425 is applied against the force sensor(s) and/or placement sensor(s) 450, 453 of the floor pad controller 456. Applying force to any force sensor(s) and/or placement sensor(s) 450, 453 in the pattern results in an action by an action FIG. 966 displayed on the monitor 965 by the processor 972, in accordance with an instruction from the exercising or video gaming system 960. For example, the processor 972 executes an instruction that results in animating an action FIG. 966 in the video game in response to a force being applied to the force sensor(s) and/or placement sensor(s) 450, 453 located in the unit of the grid to which the instruction corresponds.

In one embodiment, a program memory of the processor 972 contains instructions from a video game that translate a jump off of the force sensor(s) and/or placement sensor(s) 450, 453 of the floor pad controller 456 and a strike upon the force sensor(s) and/or contact sensor(s) 401-412 of the striking controller 438 by the user 420, or instead, only a strike by the user 420 upon the striking controller 438 into an action figure's 966 jump kick on the video monitor 965. The user 420 may observe the actions of the action FIG. 966 by looking at the monitor 965 in the direction of the arrow 454.

In one embodiment, when there is no force applied to the force sensor(s) and/or placement sensor(s) 450, 453, e.g., when the foot 425 of the user 420 is removed from the force sensor(s) and/or placement sensor(s) 450, 453, a jump by the action FIG. 966 is shown on the monitor 965, in accordance with an instruction from the exercising or video gaming system 960.

One advantage of the present invention is to provide an exercising or video gaming system 960 that does not require the user 420 to wear a microphone and headset 968. The controller(s) 456, 438 provide striking force sensor(s) and/or position information about the user 420 for controlling the exercising or video gaming system 960 without encumbering the user 420 by the weight or slippage of the microphone and headset 968, or entangling the user 420 in the wires 969 during jumping or other movements of the user 420 during use of the exercising or video gaming system 960.

In one embodiment, the exercising or video gaming system 960 comprises a dead man's switch 451 inside the floor pad controller 456 having an analog sensitivity adjuster and a hard wired logic circuit so that if no force sensor(s) and/or placement sensor(s) 450, 453 are triggered and a time determined by the analog sensitivity adjuster is exceeded, the jump signal will be sent to the processor 972, and continued to be sent to the processor 972, until a force sensor(s) and/or placement sensor(s) 450, 453 on the floor pad controller 456 is triggered, that will interpret it in accordance with the exercising or video gaming system 960 and then display the result on the monitor 965. A dead man's switch, as its name suggests, is defined as a switch that is automatically operated in case the user 420 becomes incapacitated, or withdraws from operation of the controller(s) 456, 438 for any reason such as taking a break for taking rest or sustenance, wherein the user 420 wants the exercising or video gaming system 960 to continue to operate.

In one embodiment, the exercising or video gaming system 960 comprises a microphone and headset 969 for communicating with multi-players, which does not also control the exercising or video gaming system 960. The microphone and headset 969 may communicate with the multi-players using wire 969 or wirelessly, using Bluetooth or other appropriate wireless technology.

The striking controller 438 comprises an outer shell 400 and an inner core 439. The outer shell 400, comprises force sensors and/or contact sensor(s) 401-412 arranged in a curved grid across a surface 431 of the outer shell 400, and a soft fabric or foam. The curved grid across the surface 431 of the outer shell 400 is from about 180° to about 360° about a longitudinal axis 452 of the striking controller 438. The force sensors and/or contact sensor(s) 401-412 detect force sensor(s) and/or contact of blows that may result from impact of the blows exerted upon the curved grid pattern of squares across the surface of the striking controller 438. The force sensor(s) and/or contact information from the floor pad controller 456 and the striking controller 438 are provided to the processor 972 and the processor 972 executes an action in response to an instruction from the exercising or video gaming system 960.

The inner core 439 is operably coupled to the outer shell 400, and the inner core 439 is returnably anchored to the floor 967, so that the striking controller 43 returns to an upright position after being struck by the user 420.

The outer shell 400 may comprise a soft fabric or foam that cushions the leg 429, arm 427, hand, 422, or any other portion of the body such as his hip, thigh, shoulder or head of the user 420 from the impact of the blows exerted upon the curved grid pattern of squares across the surface of the striking controller 438.

The inner core 439 of the striking controller 438 may be made of any appropriate flexible material such as carbon or stainless steel, titanium, wood, or plastic. The plastic may be polyvinylchloride (PVC), silicone, polycarbonate, polystyrene, foamed plastic, such as polystyrene foam.

The striking controller 438 may be from about 4 ft. to about 6 ft. tall, and have a diameter from about 2 ft. to about 3 ft. The striking controller 438 is preferably cylindrical, but may also be a solid trapezoidal or pyramidal shape. A ratio of the diameters of the outer shell 400 to the inner core 439 range from about 1000:1 to about 10:1.

In one embodiment, the inner core 439 may be operably coupled to the floor 967 at the interface 961 between the inner core 439 and the floor 967. The inner core 439 and the resulting interface 961 between the floor 967 and the inner core 439 may be any solid shape, such as cylindrical, cubical, pyramidal, or trapezoidal.

In one embodiment, the outer shell 400, comprising the fabric or soft cushion may advantageously extend essentially completely to the floor 967, so that the fabric or soft cushion of the outer shell 400 may cushion or protect the leg 429, arm 427, hand, 422, or any other portion of the body such as his hip, thigh, shoulder or head of the user 420 from the impact of the blows exerted upon the curved grid pattern of squares across the surface of the striking controller 438. Essentially completely extending the outer shell 400 having the fabric or soft cushion may particularly cushion or protect the leg 429, arm 427, hand, 422, or any other portion of the body such as his hip, thigh, shoulder or head of the user 420 from the impact of the blows exerted upon the bottom tier of force sensor(s) and/or contact sensor(s) 410-412, resulting in defining a safety zone 437 in which the risk of injury from the impact of the blows exerted upon the bottom tier of force sensor(s) and/or contact sensor(s) 410-412 by the leg 429, arm 427, hand, 422, or any other portion of the body such as his hip, thigh, shoulder or head of the user 420.

In one embodiment, an interactive or non-interactive safety zone 437 is provided by essentially completely extending either the combination of the outer layer 916 and the curved grid of force sensor(s) and/or contact sensor(s) 401-412 or 901-912 or the outer shell 400, within which are the force sensor(s) and/or contact sensor(s) 401-412 or 901-912, respectively, to the interface 961 between the inner core 439, 900 and the ground or floor 967 of the room, and wherein the exercising or video gaming system 960 instructs a user 420 to execute a roundhouse kick of the striking controller 438, 913 while simultaneously looking at the striking controller 438, 913 and the monitor 965.

In one embodiment, the outer shell 400 having the fabric or soft cushion has been essentially completely extended to form a safety zone 437, wherein the fabric or soft cushion may particularly cushion or protect a leg 429, arm 427, hand, 422, or any other portion of the body such as the hip, thigh, shoulder or head of the user 420 from the impact of the blows exerted upon the bottom tier 437 of force sensor(s) and/or contact sensor(s) 410-412 of the outer shell 400.

Alternatively, the interface 961 may be non-interactive if the outer shell 400 having the force sensor(s) and/or contact sensor(s) 410-412 does not extend essentially completely to the floor 967.

The force sensor(s) and/or contact sensor(s) 401-412 may be arranged in a curved grid pattern of squares across an outer striking surface 431 of the striking controller 438. The curved grid pattern of squares across the outer striking surface 431 of the striking controller 438 may be supported in an upright position, e.g. orthogonal to the floor pad controller 456 and the floor surface 967, by wrapping the curved grid pattern of squares across the outer striking surface 431 of the striking controller 438 around an inner core 439 of the striking controller 438, that may be anchored to the floor 967 at interface 961. Hereinafter, "the striking controller 438 being upright" is defined as the striking controller 438 being erect (not supine) with respect to the plane of the floor 967. A fabric or cushion layer 400 may form a cushion between the curved grid pattern of squares across the outer striking surface 431 of the striking controller 438 and the inner core 439 of the striking controller 438, to soften the force of impact from the user's leg 429, arm 427, hand, 422, or any other portion of the user's 420 body such as his hip, thigh, shoulder or head, applied against the striking controller 438.

In one embodiment, the outer striking surface 431 of the striking controller 438 may be oriented orthogonal to a floor surface 967.

The force sensor(s) and/or contact sensor(s) 401-412 are able to sense contact and force of the user's leg 429, arm 427, hand, 422, or any other portion of the user's 420 body such as his hip, thigh, shoulder or head, applied against the striking controller 438. The force sensor(s) and/or contact closure(s) 450 and 453 may be transducer(s) which convert pressure to an analog or digital signal that corresponds to the force applied to the floor pad controller 456 by the user 420, or contact closure(s) which are switches that close to complete an electrical circuit when a force is applied to the floor pad controller 456 by the user 420, or combinations thereof. The contact closure(s) may close when the force exceeds a threshold force in the amount of 2.5 Newtons.

The floor pad controller 456 and the striking controller 438 may communicate with the processor 972 via wireless communication circuit 458 of the floor pad controller 456 and the wireless communication circuit 964 of the processor 972. The wireless communication circuit(s) 458, 964, may use the wireless technology known as Bluetooth®, commonly used to link cell phones with their wireless headsets. The wireless communication circuit(s) 458, 964, may also use infrared. Alternatively, the floor pad controller 456 and the striking controller 438 may communicate with the processor 972 via wire, using RS-232 communication technology.

In one embodiment, the exercising or video gaming system 960 comprises body position sensor(s) 423, 432 directed toward a jump zone, wherein the jump zone is defined as a region into which the user 420 may jump in the direction of the arrow 962, so that the body position sensor(s) 423, 432 may be used to detect the presence of the user 420 in the jump zone when a jump has been executed in the direction of the arrow 962. The body position sensor(s) 423, 432 may emit radiation such as, for example, infrared, UV, microwave, or sound radiation and be able to detect the radiation that is absorbed or reflected by the user 420, so that the body position sensor(s) 423, 432 may be used to detect the position of the user 420 during jumping. The body position sensor(s) 423, 432 may be operably coupled to the exercising or video gaming system 960 using telescope extender(s) 435, 436.

In one embodiment, at least one body position sensor(s) 423, 432 projects electromagnetic waves onto a user 420 and detects the electromagnetic waves reflected by the user 420.

In one embodiment, the body position sensor(s) 423, 432 is operably coupled to telescoping arms 435, 436 and the coupling is an articulating joint, a hinge, or a ball and socket joint.

Figure 2:
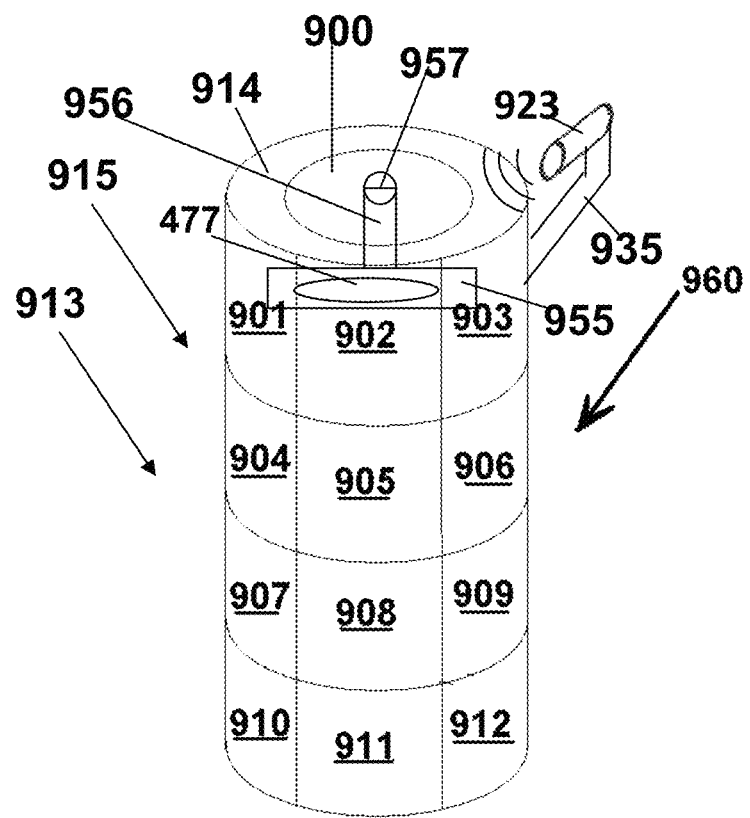
FIG. 2 depicts a front elevation view of a striking controller for an exercising or video gaming system, in accordance with embodiments of the present invention.

FIG. 2 depicts a front elevation view of a stand alone striking controller 913 for the exercising, which may be used with any exercising or video gaming system, including the exercising or video gaming system 960. The striking controller 913 comprises an outer shell 914 and an inner core 900. The outer shell 914, comprises force sensors and/or contact closure(s) 901-912 arranged in an curved grid across a surface 915 of the outer shell 914, and a soft fabric or foam. The force sensors and/or contact closure(s) 901-912 detect force sensor(s) and/or contact information applied against the striking controller 913. The force sensor(s) and/or contact information from the striking controller 913 are provided to the processor 972 and the processor 972 executes an action in response to an instruction from the exercising or video gaming system 960.

In one embodiment, a controller for an exercising or video gaming system 960, comprises a striking controller 438, 913. The striking controller 438, 913 comprises an outer shell 400, 914, wherein the outer shell 400, 914 is surrounded by a cushioning layer 916, depicted in FIG. 5, and described in associated text. The striking controller 438, 913 comprises an inner core 400, 900 and an interface 961 between the inner core 400, 900 and a floor or ground 967 for reflexively coupling the striking controller 438, 913 to the floor or ground 967 of a room.

The striking controller 438, 913 comprises force sensor(s) and/or contact sensor(s) 401-412 or 901-912 arranged in an curved grid between the outer layer 916 of the striking controller 438, 913 and the inner core 439, 900. The force sensor(s) and/or contact sensor(s) 401-412 or 901-912 comprise force sensors and contact closures to sense contact and force applied against the striking controller 438, 913. Applying force to any force sensor(s) and/or contact sensor(s) 401-412 or 901-912 in the grid executes an action in response to an instruction from the exercising or video gaming system 960.

In one embodiment, the exercising or video gaming system 960 comprises a body position sensor(s) 923 directed toward a jump zone 455, wherein the jump zone 455 is defined as a region into which the user 420 may jump in the direction of the arrow 962, so that the body position sensor(s) 423, 432 may be used to detect the presence of the user 420 in the jump zone 455 when a jump has been executed in the direction of the arrow 962. The body position sensor(s) 423, 432 may emit radiation such as, for example, infrared, UV, microwave, or sound radiation and be able to detect the radiation that is absorbed or reflected by the user 420, so that the body position sensor(s) 423, 432 may be used to detect the position of the user 420 during jumping. The body position sensor(s) 423, 432 may be operably coupled to the exercising or video gaming system 960 using telescope extender(s) 435, 436.

The controller 438, 913 for an exercising or video gaming system 960, comprises a body position sensor 923; and a radial interactive uppercut bar 955. The radial interactive uppercut bar 955 comprises a resilient radial support arm 956 operably coupled to pivot 957 of the inner core 900 of the striking controller 913. The radial interactive uppercut bar 955 comprises a force sensor and/or a contact sensor 477 for sensing the force and/or contact when the user 420 executes an upper cut punch against the force sensor and/or a contact sensor 477 in response to an instruction from the exercising or video gaming system 960.

In one embodiment, the exercising or video gaming system 960 comprises an uppercut bar 955 that has cushioning around a solid inner core 900.

Figure 3:
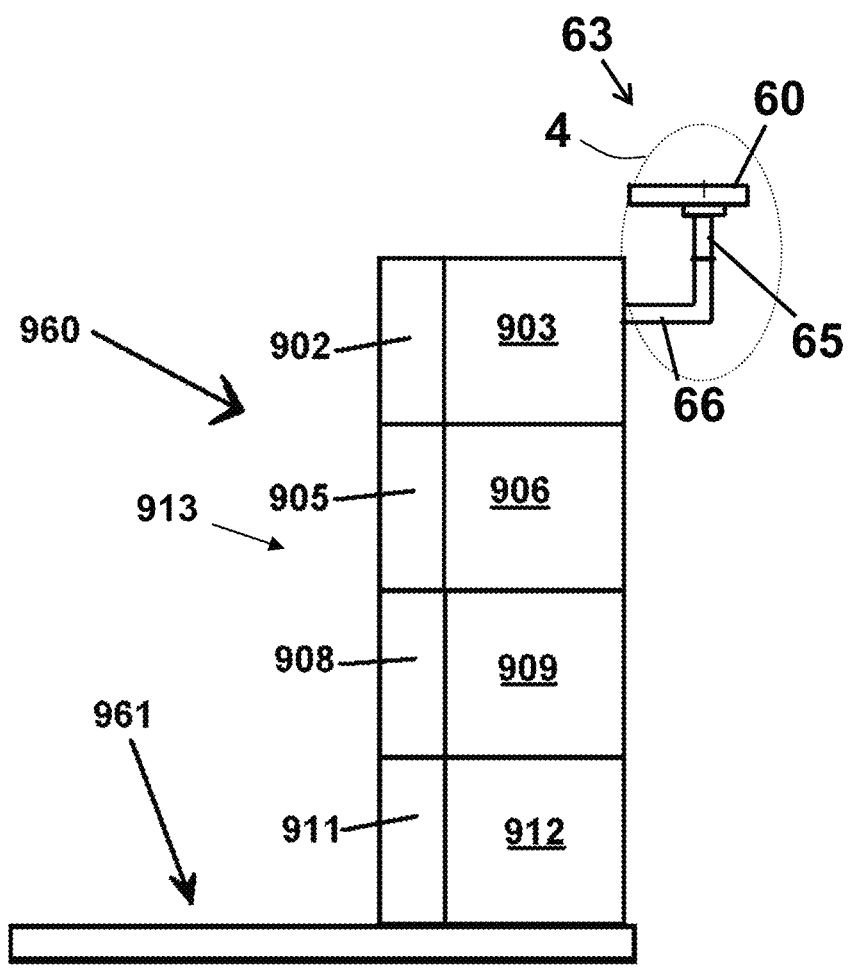
FIG. 3 depicts a longitudinal cross-sectional view of an exercising or video gaming system, in accordance with embodiments of the present invention.

FIG. 3 depicts a longitudinal cross-sectional view of the exercising or video gaming system 960, comprising a body position sensor(s) 63, wherein the body position sensor(s) 63 is operably coupled to telescoping arms 65, 66 and the coupling 61 is an articulating joint, a hinge, or a ball and socket joint.

Figure 4:
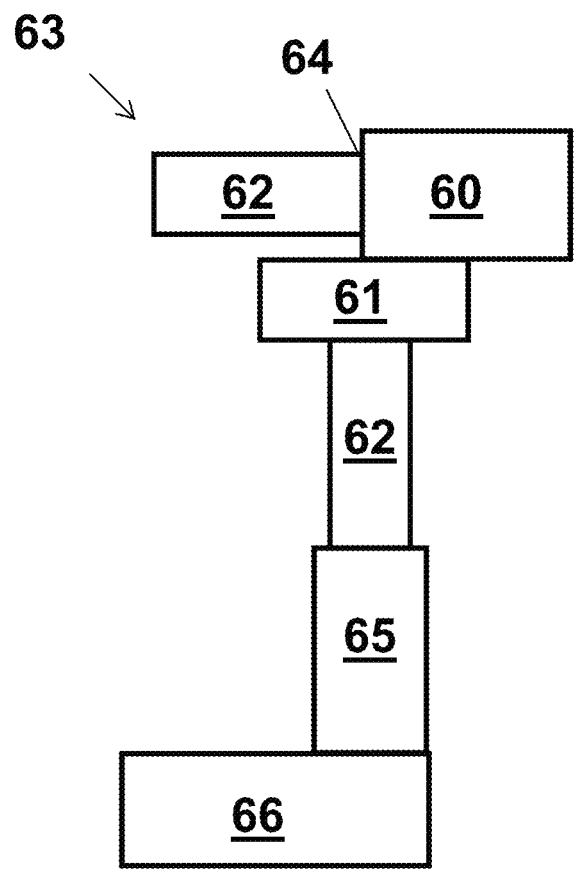
FIG. 4 depicts a longitudinal cross-sectional view of the body position sensor shown in FIG. 1, taken along the line 4-4 of FIG. 1, in accordance with embodiments of the present invention.

FIG. 4 depicts an expanded cross-sectional view of the body position sensor(s) 63, depicted in FIG. 3, comprising: a combination source and detector of radiation 60 and telescoping arms 62, 65, 66 for supporting the combination source and detector 60, and operably coupling the combination source and detector of radiation 60 to the striking controller 913, as illustrated in FIGS. 2-3, and described in associated text. The combination source and detector of radiation 60 may be operably coupled to a beam collator 62, that may use lenses to narrow or collate a beam of radiation emitted from the combination source and detector of radiation 60. The telescoping arms 62, 65, 66 may be operably coupled to the combination source and detector of radiation 60 by means of a coupling 60 such as a layer of utilitarian adhesive.

The body position sensor(s) 63 may emit radiation such as, for example, infrared, UV, microwave, or sound radiation and be able to detect the radiation that is absorbed or reflected by the user 420, so that the body position sensor(s) 63 may be used to detect the position of the user 420 during jumping. The body position sensor(s) 63 may be operably coupled to the exercising or video gaming system 960 using telescoping arms 62, 65, 66.

Figure 5:
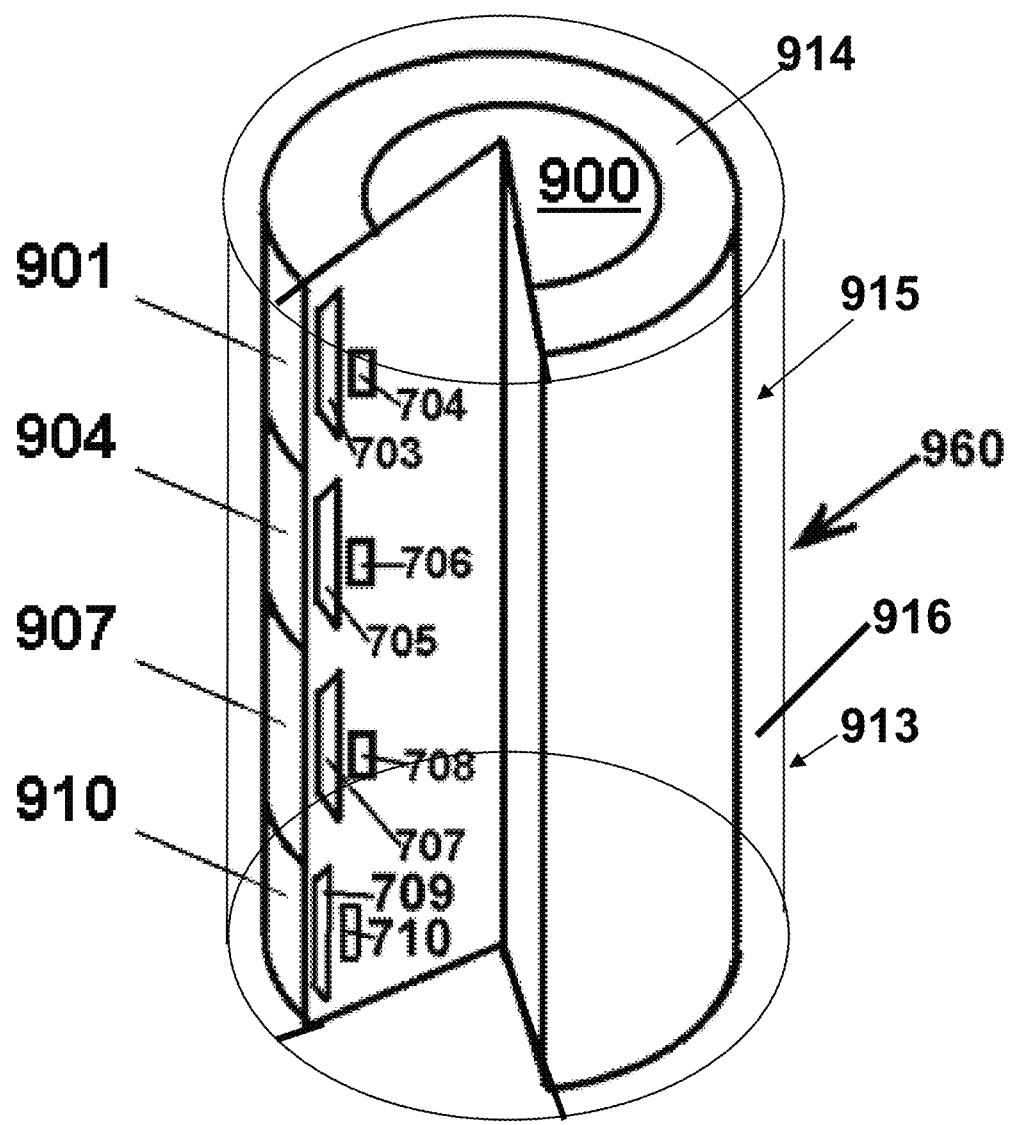
FIG. 5 depicts a saggital view of the striking controller of FIG. 2, in accordance with embodiments of the present invention.

FIG. 5 depicts a saggital view of the striking controller 913 shown in FIG. 2. FIG. 5 depicts an embodiment in which the outer shell 914 may comprise force sensors and/or contact sensor(s) 901-910 arranged in a curved grid across a surface 915 of the outer shell 914, and a cushioning layer 916. The cushioning layer 916 adjacent to the outer shell 914 may be a protective, transparent membrane or sheet made of polyvinylchloride (PVC), silicone, polycarbonate film, or other appropriate transparent plastic. Alternatively, the cushioning layer 916 adjacent to the outer shell 914 may be a soft fabric or foam able to soften the force of impact from the user's leg 429, arm 427, hand, 422, or any other portion of the user's 420 body such as his hip, thigh, shoulder or head, applied against the striking controller 913. The force sensors and/or contact sensor(s) 901-910 detect force sensor(s) and/or contact information applied against the striking controller 913. The force sensor(s) and/or contact information from the striking controller 913 are provided to the processor 972 and the processor 972 executes an action in response to an instruction from the exercising or video gaming system 960. In one embodiment, the force sensor(s) and/or contact sensor(s) 901-910, comprise force sensor(s) 704, 706, 708, 710 and/or contact closure(s) 703, 705, 707, 709, respectively.

Figure 6:
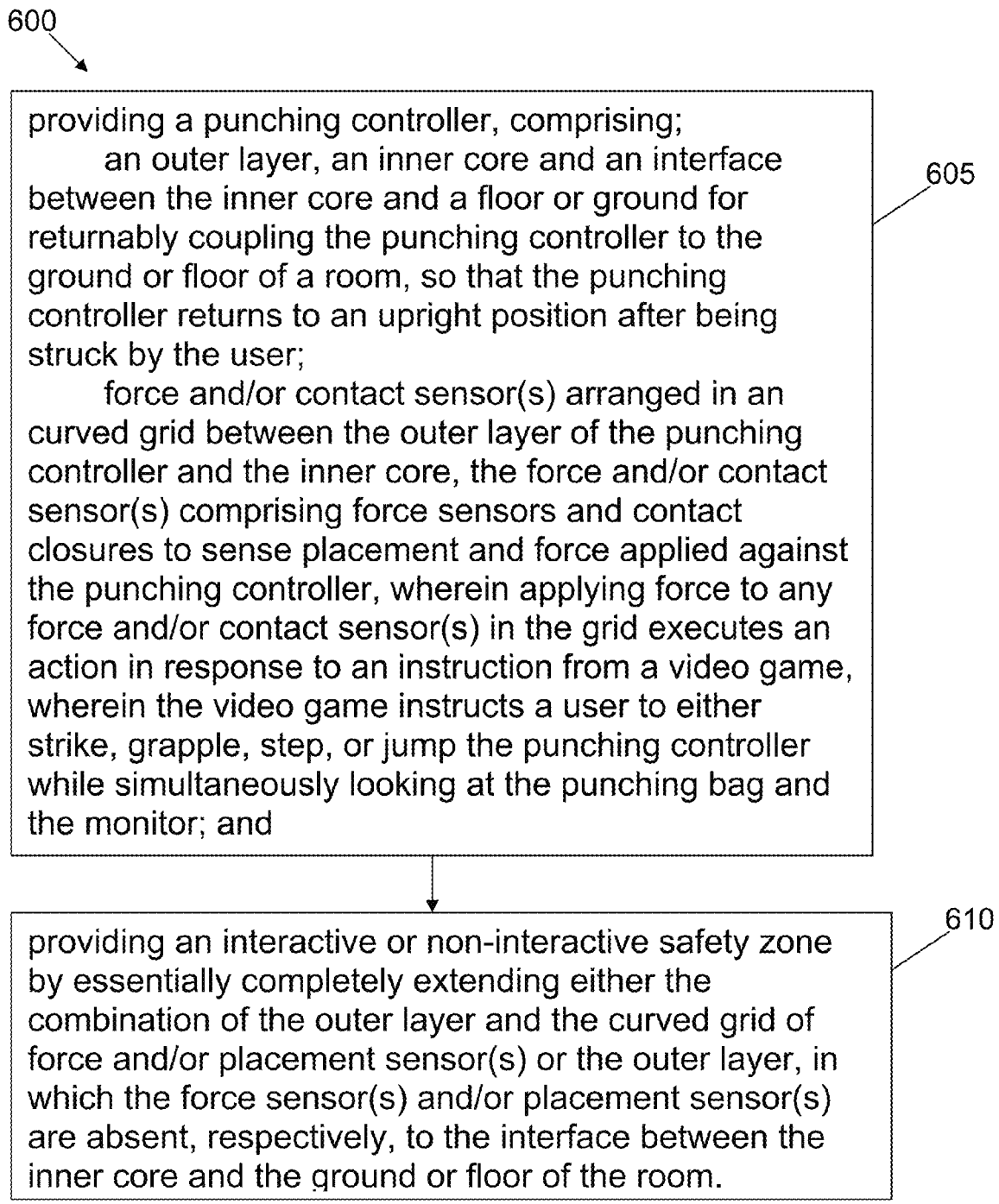
FIG. 6 depicts a flow diagram of a method for safely using the exercising or video gaming system, in accordance with embodiments of the present invention.

FIG. 6 depicts a method 600 for safely playing an interactive exercising or video gaming system 960. The method 600 comprises a step 605 in which a striking controller 438, 913 is provided. The striking controller 438, 913 comprises an outer layer, an inner core and an interface 916 between a floor or ground 967 for anchoring the striking controller 438, 913 to the ground or floor 967 of a room. The interface 916 and striking controller 438, 913 are operably coupled.

The striking controller 438, 913 comprises force sensor(s) and/or contact sensor(s) 401-412, 901-912 arranged in an curved grid across the surface 431 of an outer layer 400 of the striking controller 438, 913, the force sensor(s) and/or contact sensors 401-412, 901-912 for sensing contact and force applied against the striking controller 438, 913, comprising force sensors and contact closure(s) to sense contact and force applied against the striking controller 438, 913. In the method 600, step 605, applying force to any force sensor(s) and/or contact sensor(s) 401-412, 901-912 in the grid executes an action in response to an instruction from the interactive exercising or video gaming system 960. The outer layer 400 of the striking controller 438, 913 may be made of a fabric or soft cushion or any soft, cushioning material.

In the step 605, a user 420 is instructed by the interactive exercising or video gaming system 960 to safely either strike, grapple, step, or jump the striking controller 438, 913, while simultaneously looking at the striking controller 438, 913 and the monitor 965 in the direction of the arrow 454.

In the step 605 of the method 600, the video game is selected from the group of games consisting of side scroller games, fighting games, and combinations thereof.

In a step 610 of the method 600, an interactive or non-interactive safety zone has been provided by essentially completely extending the outer layer 400 to the floor 967, wherein the fabric or soft cushion may particularly cushion or protect a leg 429, arm 427, hand, 422, or any other portion of the body such as the hip, thigh, shoulder or head of the user 420 from the impact of the blows exerted upon a bottom tier 437 of force sensor(s) and/or contact sensor(s) 410-412 of the outer layer 400.

In one embodiment of the method 600 for safely playing an interactive exercising or video gaming system 960, the surface 431 of the force sensor(s) and/or contact sensor(s) 401-412, arranged in a curved grid across the surface 431 of the striking controller 438, 913 may be configured by a software designer.

Example 1

In a first example of an embodiment of step 605 of the method 600 for playing an interactive exercising or video gaming system 960, the software designer designates that striking any one of the force sensor(s) and/or contact sensor(s) 401, 403, 404, 406 or 901, 903, 904, 906 of the striking controller(s) 438, 913 sends a signal 1 (input 1) to the processor 972 of the exercising or video gaming system 960.

In like manner, the software designer designates that striking any one of the force sensor(s) and/or contact sensor(s) 407, 409, 410, 412 or 907, 909, 910, 912 of the striking controller(s) 438, 913, sends a signal 2 (input 2) to the processor 972 of the exercising or video gaming system 960.

In like manner, the software designer designates that striking any one of the force sensor(s) and/or contact sensor(s) 402, 405 or 902, 905 running along the longitudinal axis of the striking controller(s) 438, 913 sends a signal 3 (input 3) to the processor 972 of the exercising or video gaming system 960.

In like manner, the software designer designates that striking any one of the force sensor(s) and/or contact sensor(s) 408, 411 or 908, 911 running along the longitudinal axis of the striking controller 438, 913 sends a signal 4 (input 4) to the processor 972 of the exercising or video gaming system 960.

Each of the inputs 1-4 may send a signal to the processor 972 via wireless transmitter 459 or via a hard wire when the user 420 strikes them, and software of the exercising or video gaming system 960 being run on the processor 972 results in the exercising or video gaming system 960 displaying various actions of the action FIG. 966 in the monitor 965, such as, for example, a high kick, a low kick, a high punch or a low punch actions.

In this example, a signal from input 1 (initiated by user 420 striking the force sensor(s) and/or contact sensor(s) 401, 403, 404, 406 or 901, 903, 904, 906 of the striking controller(s) 438, 913) results in the exercising or video gaming system 960 displaying a high kick action to the action FIG. 966 in the monitor 965.

In like manner, a signal from input 2 (initiated by user 420 striking the force sensor(s) and/or contact sensor(s) 407, 409, 410, 412, or 907, 909, 910, 912 of the striking controller(s) 438, 913) results in the exercising or video gaming system 960 displaying a low kick action to the action FIG. 966 in the monitor 965.

In like manner, a signal from input 3 (initiated by user 420 striking the force sensor(s) and/or contact sensor(s) 402, 405, or 902, 905 running along the longitudinal axis of the striking controller(s) 438, 913) results in the exercising or video gaming system 960 displaying a high punch action to the action FIG. 966 in the monitor 965.

In like manner, a signal from input 4 (initiated by user 420 striking the force sensor(s) and/or contact sensor(s) 408, 411 or 910, 911 running along the longitudinal axis of the striking controller(s) 438, 913), results in the exercising or video gaming system 960 displaying a low punch action to the action FIG. 966 in the monitor 965.

The software configuration of this Example may be advantageous for playing fighting games. Providing two (2) buttons, i.e. force sensor(s) and/or contact sensor(s) arranged parallel to the longitudinal axis 452 in a curved grid across the surface 431, 915, of the striking controller(s) 438, 913 e.g., 401, 404 or 403, 406 or 901, 904 or 903, 906 of the striking controllers 438, 913, respectively is advantageous as they would allow the user 420 of the exercising or video gaming system 960 to assign a higher degree of difficulty to the high kick when the a more flexible user 420 kicks force sensor(s) and/or contact sensor(s) 401, 403 while a less flexible user 420 can simply kick force sensor(s) and/or contact sensor(s) 404, 406. Hereinafter, "buttons" are used synonymously and defined as force sensor(s) and/or contact sensor(s) 401-412 or 901-912 of the striking controller(s) 438, 913, respectively. The vertically disposed side buttons may be advantageous as they would allow a more flexible user 420 to kick higher while a less flexible user 420 can still kick, but lower, without injuring themselves. The user thereby customizes their difficulty.

Example 2

In a second example, in one embodiment of the step 605 of the method 600 for playing an interactive exercising or video gaming system 960, the software designer designates that striking any one of the force sensor(s) and/or contact sensor(s) 401, 402, 403, or 901, 902, 903 of the striking controller(s) 438, 913 sends a signal 1 (input 1) to the processor 972 of the exercising or video gaming system 960.

In like manner, the software designer designates that striking any one of the force sensor(s) and/or contact sensor(s) 410, 411, 412 or 910, 911, 912 of the striking controller(s) 438, 913 sends a signal 2 (input 2) to the processor 972 of the exercising or video gaming system 960.

In like manner, the software designer designates that striking any one of the force sensor(s) and/or contact sensor(s) 404, 407 or 904, 907 of the striking controller(s) 438, 913 sends a signal 3 (input 3) to the processor (972) of the exercising or video gaming system 960.

In like manner, the software designer designates that striking any one of the force sensor(s) and/or contact sensor(s) 406, 409 or 906, 909 of the striking controller 438, 913 sends a signal 4 (input 4) of the exercising or video gaming system 960.

In like manner, the software designer designates that striking any one of the force sensor(s) and/or contact sensor(s) 405 or 905, running along the longitudinal axis of the striking controller 438, 913, sends a signal 5 (input 5) to the processor 972 of the exercising or video gaming system 960.

In like manner, the software designer designates that striking any one of the force sensor(s) and/or contact sensor(s) 408 or 908, running along the longitudinal axis of the striking controller 438, 913, sends a signal 6 (input 6) of the exercising or video gaming system 960.

Each of the inputs 1-6 may send a signal to the processor 972 via wireless transmitter 459 or via a hard wire when the user 420 strikes them, and software of the exercising or video gaming system 960 being run on the processor 972 results in the exercising or video gaming system 960 displaying various actions of the action FIG. 966 in the monitor 965, such as, for example, moving upward vertically, moving downward vertically, moving leftwise horizontally or moving rightwise horizontally.

The software configuration of this Example may be advantageous for playing rhythmic games wherein inputs 1, 2, 3, and 4, have been associated with movement of the action FIG. 966 in up, down, left and right directions. The upper middle button 405, associated with input 5, is associated with actions of the action FIG. 966, such as punches, e.g., an uppercut or a hand chop, while the lower middle button 408, associated with input 6, is associated with actions of the action FIG. 966, such as a trip or a snap kick.

Providing two (2) buttons, i.e. force sensor(s) and/or contact sensor(s) arranged parallel to the longitudinal axis 452 in a curved grid across the surface 431, 915, of the striking controller(s) 438, 913 e.g., 404, 407 or 406, 409 or 904, 907 or 906, 909 of the striking controllers 438, 913, respectively, is advantageous as it enables the user 420 of the exercising or gaming system 960 to assign a higher degree of difficulty to the high kick when a more flexible user 420 kicks force sensor(s) and/or contact sensor(s) 404, 406 while a less flexible user 420 can simply kick force sensor(s) and/or contact sensor(s) 407, 409. Providing two (2) buttons, vertically disposed along the longitudinal axis 452 is advantageous because two (2) buttons provide an easier target than providing only one (1) button for registering the kick because two (2) buttons provide more area than is provided by one (1) button, enabling a more flexible user 420 to kick higher while a less flexible user 420 can still kick, but lower, without injuring themselves. The user thereby customizes their difficulty.

Example 3

In a third example, in one embodiment of the step 605 of the method 600 for playing an interactive exercising or video gaming system 960, the software designer designates that striking any one of the force sensor(s) and/or contact sensor(s) 402, or 902 of the striking controller(s) 438, 913 sends a signal 1 (input 1) to the processor 972 of the exercising or video gaming system 960.

In like manner, the software designer designates that striking any one of the force sensor(s) and/or contact sensor(s) 411 or 911 of the striking controller(s) 438, 913 sends a signal 2 (input 2) to the processor 972 of the exercising or video gaming system 960.

In like manner, the software designer designates that striking any one of the force sensor(s) and/or contact sensor(s) 401, 404, 407, 410 or 901, 904, 907, 910 of the striking controller(s) 438, 913 sends a signal 3 (input 3) to the processor (972) of the exercising or video gaming system 960.

In like manner, the software designer designates that striking any one of the force sensor(s) and/or contact sensor(s) 403, 406, 409, 412 or 903, 906, 909, 912 of the striking controller 438, 913 sends a signal 4 (input 4) of the exercising or video gaming system 960.

In like manner, the software designer designates that striking any one of the force sensor(s) and/or contact sensor(s) 405 or 905, running along the longitudinal axis of the striking controller 438, 913, sends a signal 5 (input 5) to the processor 972 of the exercising or video gaming system 960.

In like manner, the software designer designates that striking any one of the force sensor(s) and/or contact sensor(s) 408 or 908, running along the longitudinal axis of the striking controller 438, 913, sends a signal 6 (input 6) of the exercising or video gaming system 960.

Each of the inputs 1-6 may send a signal to the processor 972 via wireless transmitter 459 or via a hard wire when the user 420 strikes them, and software of the exercising or video gaming system 960 being run on the processor 972 results in the exercising or video gaming system 960 displaying various actions of the action FIG. 966 in the monitor 965, such as, for example, executing an uppercut, executing a trip, executing a crescent kick or executing a flicking roundhouse kick.

The software configuration of this Example may be advantageous for playing advanced fighting games or simulators wherein inputs 1, 2, 3, 4, 5, and 6, have been associated with different attack actions of the action FIG. 966. The upper middle button 402, associated with input 1, is associated with actions of the action FIG. 966, such as an uppercut or a high hand chop. The middle upper middle button 405, associated with input 5, is associated with actions of the action FIG. 966, such as a straight arm punch. The middle lower middle button 408, associated with input 6, is associated with actions of the action FIG. 966, such as a snap kick. The lower middle button 411, associated with input 2, is associated with actions of the action FIG. 966, such as a trip. The left hand side group of button(s) 401, 404, 407, 410 or 901, 904, 907, 910, associated with input 3, is associated with actions of the action FIG. 966, such as a right crescent kick or a left flicking roundhouse. The right hand side group of button(s) 403, 406, 409, 412 or 903, 906, 909, 912, associated with input 4, is associated with actions of the action FIG. 966, such as a left crescent kick or a right flicking roundhouse kick.

Providing four (4) buttons, i.e. force sensor(s) and/or contact sensor(s) arranged parallel to the longitudinal axis 452 in a curved grid across the surface 431, 915, of the striking controller(s) 438, 913 e.g., 401, 404, 407, 410 or 403, 406, 409, 412 or 901, 904, 907, 910 or 903, 906, 909, 912 of the striking controllers 438, 913, respectively, is advantageous as it enables the user 420 of the exercising or video gaming system 960 to assign a higher degree of difficulty to the kick when a more flexible user 420 kicks force sensor(s) and/or contact sensor(s) 401, 403 while a less flexible user 420 can simply kick force sensor(s) and/or contact sensor(s) 410, 412. Providing four (4) buttons, vertically disposed along the longitudinal axis 452 is advantageous because four (4) buttons provide an easier target than providing only one (1) button for registering the kick because four (4) buttons provide more area than is provided by one (1) button, enabling a more flexible user 420 to kick higher while a less flexible user 420 can still kick, but lower, without injuring themselves. The user thereby customizes their difficulty.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A striking controller, comprising:
 an outer layer,
  wherein the outer layer is made of a material consisting essentially of fabric;
 an outer shell; and
 an inner core,
  wherein the outer shell comprises sensor(s),
  wherein the outer shell is adjacent to the outer layer and the outer shell is entirely between the outer layer and the inner core,
  wherein the sensor(s) are selected from the group consisting of force sensor(s), placement sensor(s), and both force sensor(s) and placement sensor(s),
  wherein the sensor(s) sense force applied against the striking controller,
  wherein applying force to any sensor(s) executes an action in response to an instruction from the exercising or video gaming system, and
  wherein the inner core is returnably coupled to the ground or floor of a room, so that the striking controller returns to an upright position after being struck by the user.

2. The striking controller of claim 1,
 wherein the outer layer is extended to the interface between the inner core and the ground or floor of the room, to form a safety zone,
 wherein the outer layer cushions or protects a leg, an arm, a hand, a hip, a thigh, a shoulder, or a head of the user from an impact from the blows exerted upon a bottom tier of the sensor(s) of the outer shell.

3. The striking controller of claim 1, further comprising at least one body position sensor(s) directed toward a jump zone.

4. The striking controller of claim 3, wherein the body position sensor(s) is operably coupled to telescoping arms and the coupling is an articulating joint, a hinge, or a ball and socket joint.

5. The striking controller of claim 1, wherein a program memory of a processor contains instructions that translate a jump and a strike upon the striking controller by the user or individually a strike by the user upon the striking controller into an action figure's jump kick on a video monitor.

6. The striking controller of claim 1, wherein the force sensor(s) and/or contact sensor(s) are in a curved grid, and the curved grid is from about 180° to about 360° about the striking controller.

7. The striking controller of claim 1, further comprising a microphone and headset for communicating with multi-players, which does not also control the exercising or video gaming system.

8. The striking controller of claim 1, further comprising a hard wire jump switch having an analog sensitivity adjuster and a hard wired logic circuit so that if no switches are triggered and a time determined by the analog sensitivity adjuster is exceeded, a jump signal will be sent and continued to be sent until a placement sensor on a pad is triggered.

9. The striking controller of claim 1,
  wherein the sensor(s) are arranged parallel to a longitudinal axis in the curved grid across the surface of the striking controller(s),
  wherein a kick to the striking controller causes execution of executes an action in response to an instruction from the exercising or video gaming system, and
  wherein the sensors are side buttons that are longer vertically than horizontally that advantageously allow a more flexible user to kick higher while a less flexible user can still kick, but lower, without injuring themselves, the user thereby customizing their difficulty.

10. A striking controller, comprising:
an outer layer,
  wherein the outer layer is made of a material consisting essentially of fabric;
an outer shell; and
an inner core,
  wherein the outer shell comprises sensor(s),
  wherein the outer shell is adjacent to the outer layer and the outer shell is entirely between the outer layer and the inner core,
  wherein the sensor(s) are selected from the group consisting of force sensor(s), placement sensor(s), and both force sensor(s) and placement sensor(s),
  wherein the sensor(s) sense force applied against the striking controller,
  wherein applying force to any sensor(s) executes an action in response to an instruction from the exercising or video gaming system, and
  wherein the inner core is returnably coupled to the ground or floor of a room, so that the striking controller returns to an upright position after being struck by the user,
  wherein the outer layer is extended to the interface between the inner core and the ground or floor of the room, to form a safety zone, and wherein the fabric or soft cushion cushions or protects a leg, an arm, a hand, a hip, a thigh, a shoulder, or a head of the user from an impact from the blows exerted upon a bottom tier of the sensor(s) of the outer shell.

11. A striking controller, comprising:
an outer layer,
an outer shell; and
an inner core,
  wherein the outer shell comprises sensor(s),
  wherein the outer shell is adjacent to the outer layer and the outer shell is entirely between the outer layer and the inner core,
  wherein the sensor(s) are selected from the group consisting of force sensor(s), placement sensor(s), and both force sensor(s) and placement sensor(s),
  wherein the sensor(s) sense force applied against the striking controller,
  wherein applying force to any sensor(s) executes an action in response to an instruction from the exercising or video gaming system,
  wherein the sensor(s) are arranged parallel to a longitudinal axis in the curved grid across the surface of the striking controller(s),
  wherein at least two sensors are side buttons that are longer vertically than horizontally that advantageously allow a more flexible user to kick higher while a less flexible user can still kick, but lower, without injuring themselves, the user thereby customizing their difficulty, and
  wherein the inner core is returnably coupled to the ground or floor of a room, so that the striking controller returns to an upright position after being struck by the user.

\* \* \* \* \*